B. P. GRAVES.
MILLING MACHINE.
APPLICATION FILED NOV. 24, 1917.
1,286,292.
Patented Dec. 3, 1918.
4 SHEETS—SHEET 4.
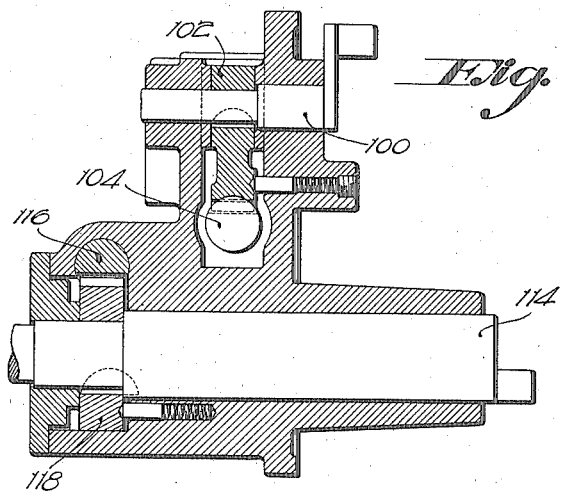
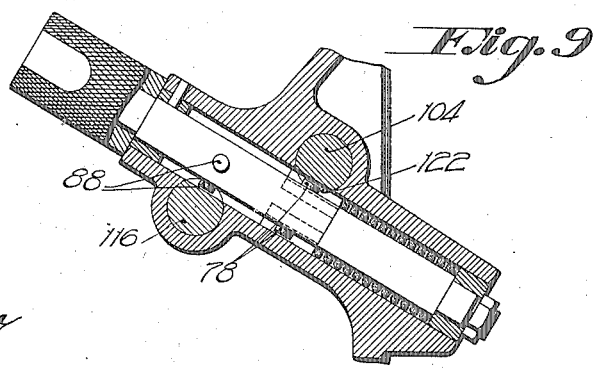
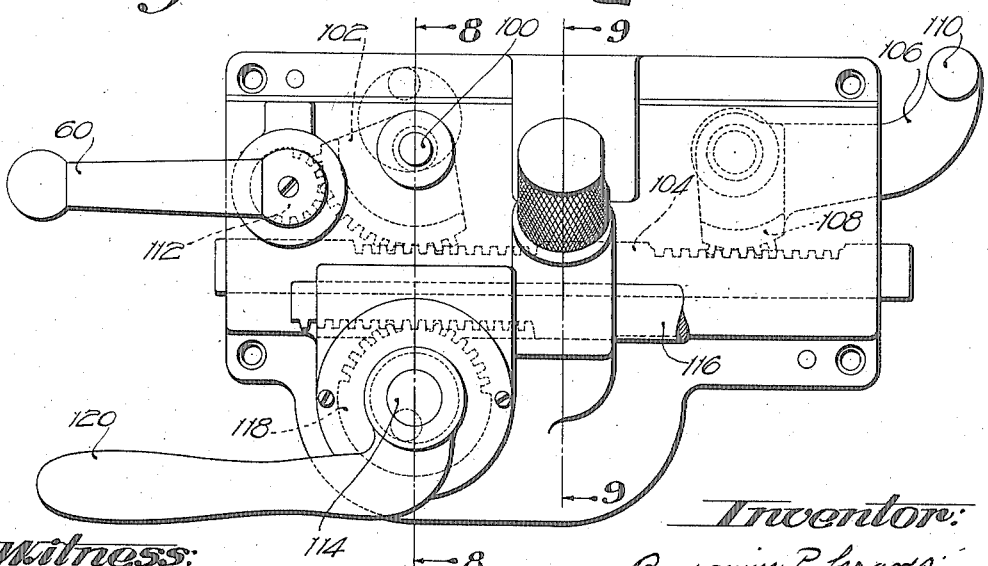

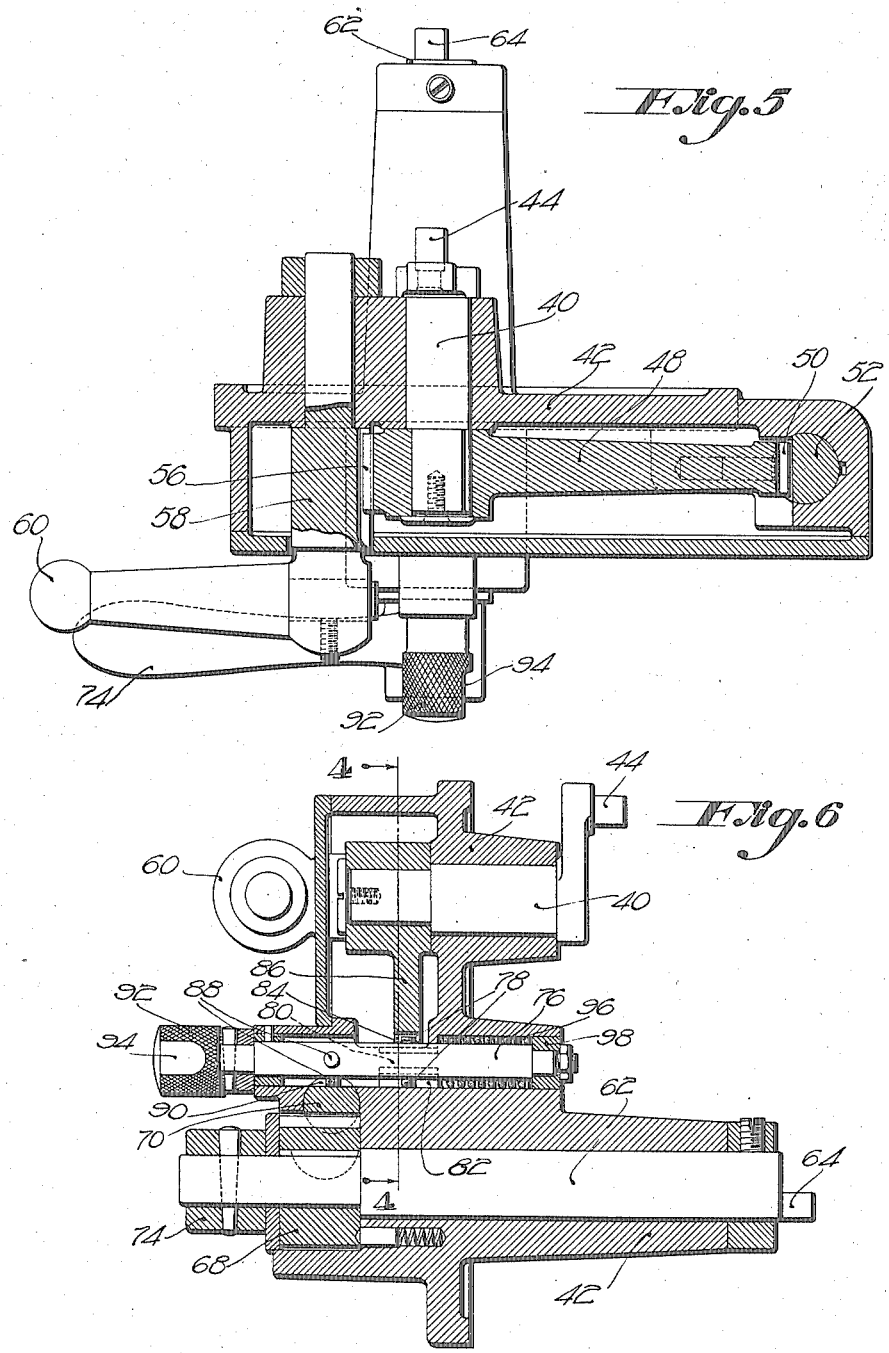

UNITED STATES PATENT OFFICE.

BENJAMIN P. GRAVES, OF PROVIDENCE, RHODE ISLAND, ASSIGNOR TO BROWN AND SHARPE MANUFACTURING COMPANY, OF PROVIDENCE, RHODE ISLAND, A CORPORATION OF RHODE ISLAND.

MILLING-MACHINE.

1,286,292.  Specification of Letters Patent.  Patented Dec. 3, 1918.

Application filed November 24, 1917. Serial No. 203,727.

*To all whom it may concern:*

Be it known that I, BENJAMIN P. GRAVES, a citizen of the United States, residing at Providence, in the county of Providence and State of Rhode Island, have invented certain new and useful Improvements in Milling-Machines; and I do hereby declare the following to be a full, clear, and exact description of the invention, such as will enable others skilled in the art to which it appertains to make and use the same.

The invention relates to milling machines in which the work table is mounted on a transversely movable saddle which is in turn mounted on a vertically movable knee.

Machines of this type are usually provided with transverse and vertical feeds, and with feed controlling handles or analogous devices, by which the feeds may be thrown in and out, which are arranged where they may be conveniently reached by the operator when he is in position to observe the work and its relation to the cutter. Since the operator's attention is usually centered on the work and cutter, when he throws in the automatic feed he is liable to inadvertently throw in the wrong feed, thus injuring or spoiling the work, or the work and cutter. This danger increases in case the devices by which the feeds are thrown in are conveniently arranged adjacent to each other. It is the object of the present invention to provide means by which this inadvertent throwing in of the improper feed may be prevented, and to that end the invention contemplates the provision of means for selectively rendering inoperative the devices by which the operator throws in the transverse and vertical feeds of the machine. The devices may be rendered inoperative to start the feed in any suitable manner, so far as the broader aspects of the invention are concerned, although it is preferred to render them inoperative by locking them against movement by the operator. This contributes to the simplicity of the construction, and also instantly indicates his mistake to the operator, in case he inadvertently attempts to throw in the improper feed. It is also preferred to utilize a locking device which when set or adjusted to different positions, will selectively lock or free the feeds, although such construction is not essential to the broader features of the invention.

The features outlined above, as well as certain further features set forth in the claims, will be understood from an inspection of the accompanying drawings and the following detailed description of the mechanism illustrated therein.

Figure 1:
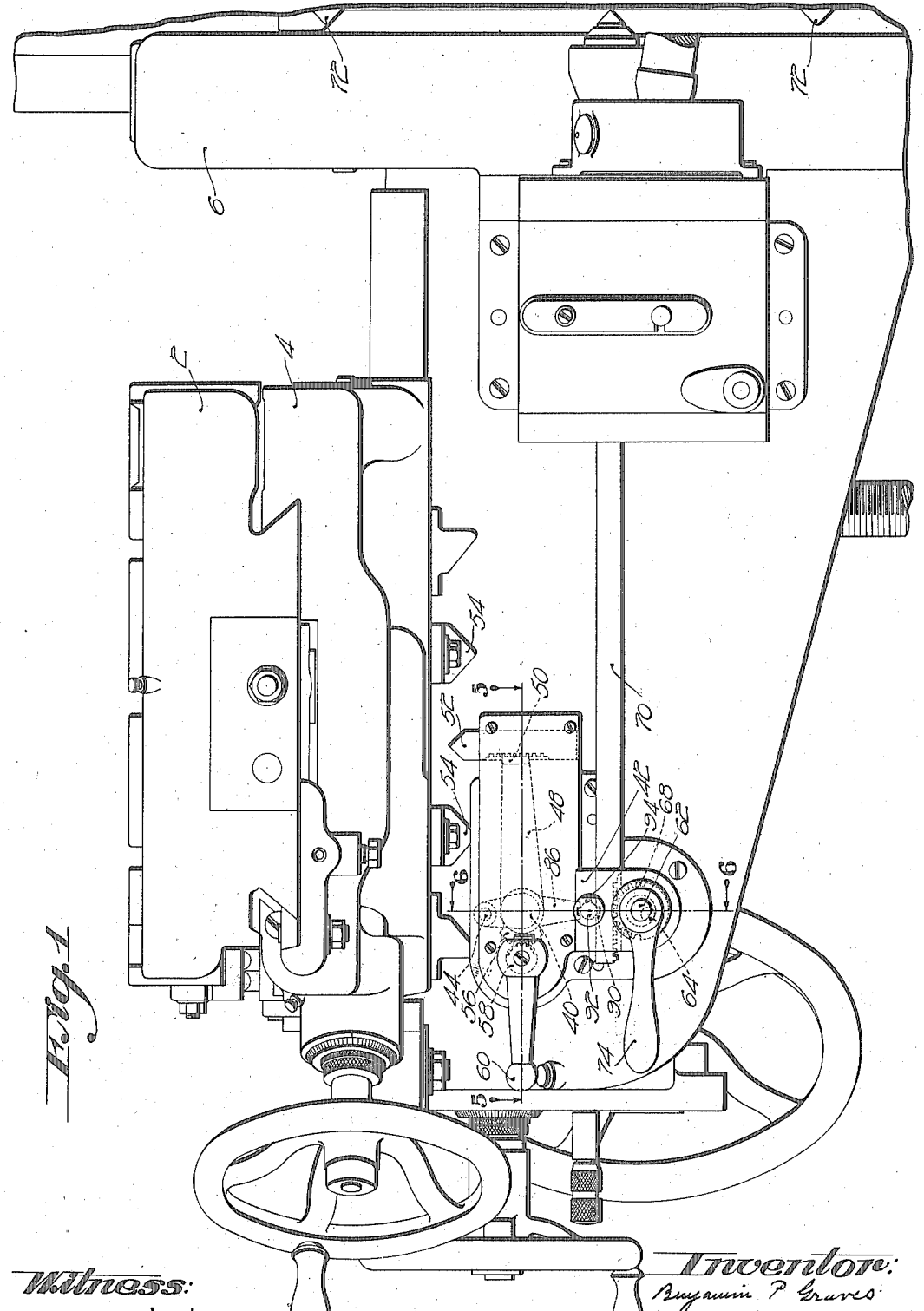
Figure 2:
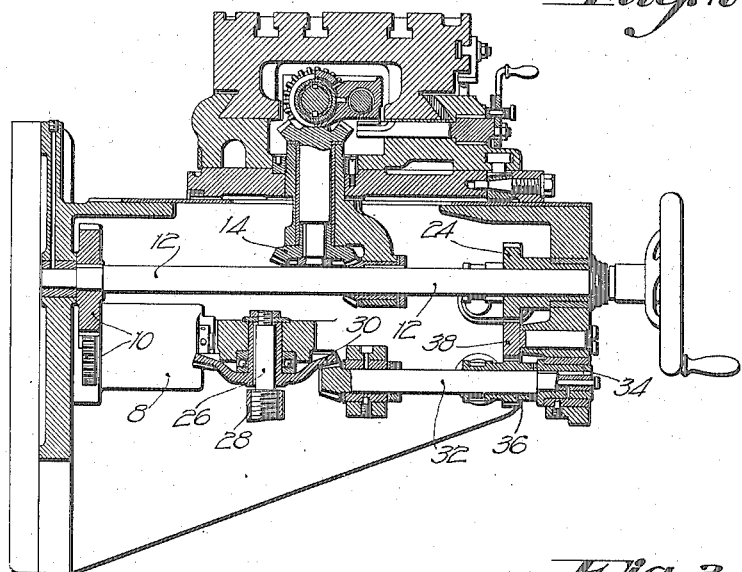
Figure 3:
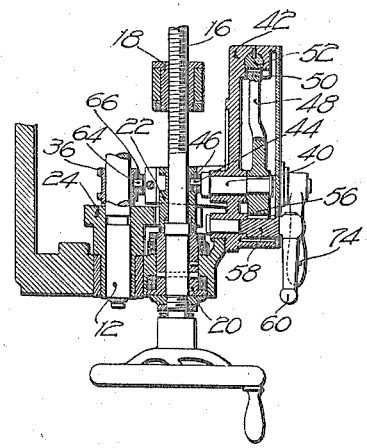
Figure 4:
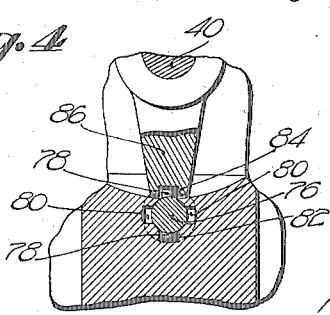

In the drawings, Figure 1 is a side elevation showing so much of a milling machine as is necessary to illustrate the application of the present invention thereto; Fig. 2 is a transverse sectional view showing the feed mechanisms; Fig. 3 is a horizonal sectional view showing parts of the transverse and vertical feed mechanism; Fig. 4 is a sectional detail on line 4—4, Fig. 6; Fig. 5 is a sectional detail on line 5—5, Fig. 1; Fig. 6 is a sectional detail on line 6—6, Fig. 1; Fig. 7 is a detail elevation showing a modified form of feed tripping and locking mechanism; Fig. 8 is a sectional view on line 8, Fig. 7; and Fig. 9 is a sectional view on line 9, Fig. 7.

The milling machine indicated in the drawings is provided with the usual table 2, saddle 4, and knee 6, and with the usual spindle and driving mechanism (not shown). The mechanisms for feeding the table longitudinally on the saddle, for transversely feeding the saddle on the knee, and for vertically feeding the knee, are driven through the reverse case 8 secured on the knee and containing reverse gearing which is connected through gears 10 with a shaft 12 mounted in the knee. The mechanism for feeding the table on the saddle is driven from this shaft through gearing 14 indicated in Fig. 2. The transverse feed mechanism comprises a screw shaft 16 engaging a nut 18 carried by the saddle. A sleeve 20 is secured to the outer end of the screw shaft, and is provided on its inner end with a clutch member adapted to be engaged by a clutch member on the hub of a gear 22 which is loosely mounted on the shaft. This clutch gear is driven from the shaft 12 through the gear 24, and the transverse feed is thrown in or out by movement of the gear 22 to engage or disengage the clutch members. The vertical feed mechanism comprises a screw shaft 26 mounted on the knee and engaging a nut 28 in the upper end of a fixed standard. The upper end of the screw shaft 26 is connected by bevel gearing 30 with a shaft 32 mounted in the knee. A sleeve 34 is secured to the outer end of this shaft, and is provided at its inner end with a clutch member adapted to be engaged by a clutch member on the hub of a gear 36 which is loosely mounted on the shaft. The gear 36 is driven from the shaft 12 through the gear 24 and an intermediate gear 38. The vertical feed is thrown in and out by movement of the gear 36 to engage or disengage the clutch members.

The mechanism for throwing the transverse feed in and out comprises a rock shaft 40 mounted in a casing 42 on the side of the knee, and provided at its inner end with a crank pin 44 engaging a shoe 46 which fits in an annular groove in the hub of the gear 22. A lever 48 is secured to the outer end of the rock shaft 40, and is provided at the end of its long arm with a gear segment 50 engaging rack teeth formed in a vertically movable tripping pin 52. The upper end of the tripping pin is V-shaped, and is adapted to be engaged and operated to throw out the feed by engagement with tripping dogs 54 adjustably secured on the saddle. The short arm or hub of the lever 48 is provided with a gear segment 56 engaged by a gear segment formed on a rock shaft 58, to the outer end of which an operating handle 60 is secured. By movement of the handle 60 the operator may shift the gear 22 to throw the transverse feed in or out.

The mechanism for throwing the vertical feed in and out comprises a rock shaft 62 mounted in the casing 42 adjacent to the shaft 40, and provided at its inner end with a crank pin 64 engaging a shoe 66 which fits within an annular groove in the hub of the gear 36. A collar 68 is secured to the shaft 62, and is provided with gear teeth engaged by a rack formed on the outer end of the tripping bar 70. The inner end of the bar is V-shaped, and is adapted to be engaged and operated to throw out the vertical feed by engagement with one of the tripping dogs 72 which are adjustably secured on the frame of the machine. An operating handle 74 is secured to the outer end of the shaft 62, and may be manipulated by the operator to throw the vertical feed in or out.

To prevent the inadvertent throwing in of the improper feed by the operator, means is provided for selectively rendering inoperative the devices through which the operator throws in the feeds. In the construction shown this means comprises a locking device in the form of a plunger 76 which may be so set or adjusted by the operator that it will lock either the transverse or the vertical feed clutch in neutral position, and will prevent the movement of the corresponding operating handle by the operator. The locking plunger and the coöperating parts are also so constructed that by proper adjustment of the plunger the operator may also lock both feeds or free both feeds for normal manipulation. In the construction shown in Figs. 1, 4, 5 and 6, the locking plunger 76 is provided with two oppositely projecting lugs or pins 78 adapted to register with and engage either the two horizontal slots 80 formed in the casing 42, or a vertical slot 82 formed in the casing, and a slot 84 formed in an arm 86 which projects from the hub of the transverse feed trip lever 48. The plunger is also provided with two pins or lugs 88 projecting from the plunger at an angle of 90 degrees to each other, one of the pins being in line with one of the pins 78, as shown in Fig. 6. The pins 88 are arranged to be brought into or out of engagement with a transverse slot 90 in the upper side of the trip rod 70. The slot is so arranged that it is in position to be engaged by pins 88 when the vertical feed is thrown out. A knurled knob or head 92 is secured to the outer end of the locking plunger, and this head is provided with a flattened portion 94 which may conveniently indicate the adjustment of the plunger. The plunger is held in its inner position indicated in Fig. 6 by a spring 96 which engages a collar 98 secured to the rear end of the plunger.

When the parts are in the position indicated in Fig. 6, one of the pins 88 engages the groove 90 in the trip bar 70, one of the pins 78 engages the groove in the arm 86 of the tripping lever 48, and the other pin 78 engages a groove 82 in the casing 42. This latter pin 78 holds the locking pin from rotation while the other pin 78 and the pin 88 in engagement with the slot 90 lock the tripping mechanisms, so that they are inoperative to throw in either the transverse or vertical feed. If it is desired to have both feeds free or available the locking plunger may be pulled out until the lower pin 78 is free from the slot 82, and then turned until the flat portion 94 on the knob is on top, and then released. The forward movement of the plunger disengages the pins 78 and 88 from the feed operating devices, as well as disengaging the lower pin 78 from the slot 82, and the rotation of the plunger brings the pin 78 into register with the horizontal slots 80, and the pins 88 out of position to register with the slot 90, so that when the plunger snaps back into its retracted position none of the locking pins or projections are in locking position. If it is desired to lock the transverse feed only the plunger may be pulled forward, as above indicated, and rotated until the flat portion 94 is diametrically opposite the position indicated in Figs. 5 and 6, and then released so that it returns to retracted position. When the plunger is turned into this position one of the pins 78 will engage the slot in the arm 86 and the other pin will engage the slot 82 in the casing, thus locking the transverse feed. Neither of the pins 88 will, however, be in position to engage the slot 90 in the tripping bar 70, and consequently the devices for throwing the vertical feed in and out may be operated as usual. If it is desired to lock the vertical feed while leaving the transverse feed free to be operated in the usual manner, the locking plunger may be drawn out and turned into position with the flat portion 94 on the bottom and allowed to return to retracted position. The pins 78 will now engage the horizontal slots 80, holding the plunger from rotation while the pin 88, which projects horizontally in Fig. 6, will be in engagement with the slot 90 in the tripping rod 70, thus locking this rod and preventing the operation of the vertical feed. A plate may be secured to the machine to indicate to the operator the results secured by different adjustments of the plunger, if found desirable.

In Figs. 7, 8 and 9 the application of the locking plunger to a different form of feed tripping mechanism is illustrated. In the construction here shown the rock shaft 100, through which the transverse feed clutch is shifted, is operated through a gear segment 102 secured to the shaft and engaged by rack teeth on a sliding trip rod 104. The rod is operated to throw out the feed through a trip lever 106, one arm of which is provided with a gear segment 108 engaging rack teeth formed on the bar 104, and the other end of which carries a pin 110 arranged to be engaged by the trip dogs on the saddle. The handle 60 through which the operator throws the transverse feed in or out in this construction is connected with a gear segment 112 which engages the gear segment 102. In this construction the shaft 114 through which the vertical feed clutch is shifted is operated to throw out the feed by a trip rod 116 corresponding to the trip rod 70, which is provided with rack teeth engaging gear teeth formed on a collar 118 which is secured to the shaft. An operating handle 120 corresponding to the operating handle 74 is secured to the end of the shaft.

In the construction shown in these views the pins 88 on the locking plunger are arranged to engage a slot in the trip rod 116, as in the construction above described, while the pins 78 are arranged to engage a slot 122 in the trip bar 104 in locking the transverse feed. In other respects the construction is the same as above described, and the mode of operation of the locking plunger in selectively locking the mechanisms for throwing the feeds into and out of operation is the same as above described, and will be understood from such description.

While it is preferred to employ substantially the construction and arrangement of parts shown and described in embodying the invention in milling machines such as indicated in the drawings, it will be understood that this construction and arrangement is not essential to the broader features of the invention, and that it may be varied and modified as found desirable or best suited to the construction and arrangement of the feed mechanisms on the milling machines to which the invention may be applied.

Having explained the nature and object of the invention, and specifically described one form of mechanism in which it may be embodied, what is claimed is:—

1. A milling machine, having, in combination, a table, saddle and knee, transverse and vertical feed mechanisms, devices for manually throwing in the feed mechanisms, and means for selectively rendering said devices inoperative to start the corresponding feed.

2. A milking machine, having, in combination, a table, saddle and knee, transverse and vertical feed mechanisms, devices for manually throwing in the feed mechanisms, and means for selectively locking said devices against movement by the operator.

3. A milling machine, having, in combination, a table, saddle and knee, transverse and vertical feed mechanisms, and a locking device adjustable to selectively prevent the throwing in of said feeds.

4. A milling machine, having, in combination, a table, saddle and knee, transverse and vertical feed mechanisms, separate means for throwing said feeds in and out, devices for operating said means, and a locking device adjustable into locking engagement with either of said means to prevent the throwing in of the corresponding feed.

5. A milling machine, having, in combination, a table, saddle and knee, transverse and vertical feed mechanisms, separate means for throwing said feeds in and out, devices for operating said means, and a locking device adjustable into position to lock either, both or neither of said means.

6. A milling machine, having, in combination, a table, saddle and knee, transverse and vertical feed mechanisms, movable parts through which the feeds are thrown in, and a locking plunger provided with projections arranged to be selectively brought into locking engagement with said parts by variations in the position of the plunger.

7. A milling machine, having, in combination, a table, saddle and knee, transverse and vertical feed mechanisms, a movable controlling member for each feed, a locking plunger provided with two diametrically opposite projections adapted to lock one of the members, and with two projections at right angles to each other adapted to lock the other member.

8. A milling machine, having, in combination, a table, saddle and knee, transverse and vertical feed mechanisms, a movable controlling member for each feed provided with a slot, a locking plunger provided with diametrically opposite projections arranged to register with one of said slots and with two projections at right angles to each other adapted to register with the other slot, and a casing in which the plunger is mounted provided with horizontal and vertical slots arranged to register with one set of projections.

9. A milling machine, having, in combination, a table, saddle and knee, transverse and vertical feed mechanisms; a movable controlling member for each feed provided with a slot, and a locking plunger provided with projections arranged to be selectively engaged with the slots by adjustment of the plunger.

10. A milling machine, having, in combination, a table, saddle and knee, transverse and vertical feed mechanisms, a movable controlling member for each feed provided with a slot, and a locking plunger provided with projections arranged to be selectively brought into register with the slots by rotation of the plunger and to be engaged with and disengaged from the slots by endwise movement of the plunger.

BENJAMIN P. GRAVES.